United States Patent [19]

Relles et al.

[11] 4,210,731

[45] Jul. 1, 1980

[54] AROMATIC POLYFORMAL-POLYCARBONATE BLOCK POLYMERS AND METHOD FOR MAKING SAME

[75] Inventors: Howard M. Relles, Rexford; Donald S. Johnson, Scotia, both of N.Y.

[73] Assignee: General Electric Company, Schenectady, N.Y.

[21] Appl. No.: 942,950

[22] Filed: Sep. 18, 1978

[51] Int. Cl.² ............................................ C08L 69/00
[52] U.S. Cl. .................... 525/469; 525/394; 525/439; 525/905; 528/125; 528/171; 528/174; 528/199; 528/202; 528/204; 528/205
[58] Field of Search ............... 528/199, 171, 125, 174, 528/202, 204, 205; 260/860; 525/469

[56] References Cited

U.S. PATENT DOCUMENTS 3,069,386  12/1962  Barclay, Jr. .......................... 260/49

OTHER PUBLICATIONS

Transactions of the Society of Rheology 1977 21:2, pp. 273-290.

*Primary Examiner*—Theodore E. Pertilla
*Attorney, Agent, or Firm*—William A. Teoli; James C. Davis, Jr.

[57] ABSTRACT

There are provided aromatic polyformal-polycarbonate block polymers and method for making such materials. The polyformal-polycarbonate block polymers can be made by phosgenating a mixture of a bisphenol and oligomeric aromatic polyformal having terminal phenolic groups. The aromatic block polymers are high performance thermoplastics having improved hydrolytic stability compared to aromatic polycarbonates and improved heat distortion temperature compared to conventional aromatic polyformal.

9 Claims, No Drawings

AROMATIC POLYFORMAL-POLYCARBONATE BLOCK POLYMERS AND METHOD FOR MAKING SAME

BACKGROUND OF THE INVENTION

The present invention relates to block polymers composed of chemically combined blocks of aromatic polyformal oligomer and aromatic polycarbonate and method for making such materials. A mixture of an aromatic oligomeric polyformal and a bisphenol is phosgenated and the block polymer is recovered from the resulting mixture.

Prior to the present invention, aromatic polycarbonates were generally recognized as high impact thermoplastics. As shown by Barclay U.S. Pat. No. 3,069,385, aromatic bisphenol used in the production of polycarbonates, can be modified with formal linkages. The resulting aromatic polyformal oligomer was then phosgenated to produce thermoplastic materials exhibiting reduced softening temperatures as compared to conventional aromatic polycarbonates. However, the softening temperatures of the polyformal carbonates of Barclay were often below 100° C. which eliminated their use in a variety of applications.

An alternative method for modifying aromatic bisphenols of the formula,

HOROH,           (1)

with formal linkages is shown in copending application of Allan S. Hay, Ser. No. 889,393, filed Mar. 23, 1978 and assigned to the same assignee as the present invention, where R is a divalent $C_{(6-30)}$ aromatic organic radical. As shown by Hay, aromatic polyformal oligomers are made by effecting reaction between a bisphenol of formula (1), a methylene halide in the presence of a base and an organic solvent which can result in the production of a mixture of the polyformal oligomer and cyclic polyformal. Although the phosgenation of such mixture can result in aromatic polyformal carbonate having improved heat-distortion characteristics as compared to conventional aromatic polyformals, the presence of cyclic polyformal can interfere with the utility of such film forming materials.

Improved results over Hay are provided by the method of Loucks and Williams as shown in copending application Ser. No. 889,397, filed Mar. 23, 1978 assigned to the same assignee as the present invention, whereby reduced cyclic polyformal content in the linear aromatic polyformal is achieved by a filtration of the reaction product of the bisphenol and methylene halide in the presence of a base, followed by the addition of an antisolvent to the reaction mixture to effect reverse precipitation.

In copending application Ser. No. 942,952 of James C. Carnahan, filed Sept. 18, 1978 and assigned to the same assignee as the present invention, polyformal carbonates having an improved glass transition temperature sufficient to raise the heat distortion temperature of the polymer allowing it to be used in applications requiring 100° C. sterilization are provided by the employment of an aromatic bisphenol dimer in place of the aromatic polyformal oligomer of the prior art. A further rise in heat distortion temperature is achieved by phosgenating a mixture of such bisphenol formal dimer and additional bisphenol of formula (1) to produce aromatic polyformal carbonates having aromatic polycarbonate blocks chemically combined with bisphenol formal dimer groups. However, the procedure of Carnahan requires the production of the bisphenol formal dimer which is based on the use of monocapped bisphenoxide salt of copening application of James C. Carnahan, Ser. No. 942,957, also filed concurrently herewith and assigned to the same assignee as the present invention.

STATEMENT OF THE INVENTION

The present invention is based on the discovery that aromatic polyformal oligomer made by the procedure of Hay, Ser. No. 889,393 and treated in accordance with the procedure of Williams et al Ser. No. 889,397, and further combined with aromatic bisphenol of formula (1), which mixture is then phosgenated, results in the production of a block polymer comprising from 20% to 80% by weight of aromatic polyformal of the formula, $$-O-R-(-OCH_2OR-)_{\overline{x}},\qquad(2)$$

chemically combined with from about 80% to 20% of blocks of polycarbonate of the formula,

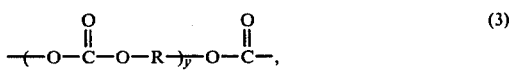

$$-(-O-\overset{O}{\underset{\|}{C}}-O-R-)_{\overline{y}}-O-\overset{O}{\underset{\|}{C}}-,\qquad(3)$$

having significantly improved heat distortion temperature as shown by a glass transition temperature as high as 130° C. or more, where R is as previously defined, x is an integer having an average value of 5 to 200 and y is an integer having an average value of 1 to 200.

In accordance with the present invention, there is provided a method for making aromatic polyformal-polycarbonate block polymer composed essentially of oligomeric aormatic polyformal blocks of formula (2) chemically combined with aromatic polycarbonate blocks of formula (3) which comprises (A) agitating a mixture containing as essential ingredients bisphenol of formula (1), methylene halide, 1.5 to 2.2 moles of alkali metal hydroxide per mole of bisphenol, and a member selected from the class consisting of a phase transfer catalyst and a dipolar aprotic solvent, to produce a mixture comprising oligomeric aromatic polyformal, (B) diluting the resulting mixture of (A) with at least 0.5 part by weight of an inert organic solvent, per part of (A), (C) filtering the resulting solution of (B), (D) while agitating the solution of (C), adding at least 0.5 part by weight of an antisolvent, per part of the solution of (C) to effect the precipitation of the oligomeric aromatic polyformal, (E) recovering and combining the aromatic polyformal of (D), with a bisphenol of formula (1) and phosgenating the resulting mixture and (F) recovering polyformal-polycarbonate block copolymer from the mixture of (E).

Radicals included within R of formulas (1)–(3) are selected from $C_{(6-30)}$ divalent aromatic hydrocarbon radicals and halogenated derivatives thereof, for example, phenylene, tolylene, xylylene, naphthalene, etc.; halogenated derivatives of such divalent aromatic hydrocarbon radicals, such as chlorophenylene, bromotolylene, etc., divalent radicals, such as $-R^1QR^1$, where $R^1$ is selected from $C_{(6-13)}$ divalent aromatic radicals, Q can be cyclohexyl, fluorenyl, $$-\text{O}-,\ -\text{S}-,\ -\overset{\overset{\text{O}}{\|}}{\text{C}}-,\ -\overset{\overset{\text{O}}{\|}}{\underset{\underset{\text{O}}{\|}}{\text{S}}}-,\ -\overset{\overset{\text{Cl}}{|}}{\underset{\underset{\text{Cl}}{|}}{\text{C}}}-\ \text{and}\ -\text{C}_2\text{H}_{2z}-,$$

where z is equal to 0 to 5 inclusive.

There are included within the bisphenols of formula (1), 2,2-bis-(4-hydroxyphenyl)-butane;
4,4'-dihydroxydiphenylmethane;
bis-(2-hydroxyphenyl)-methane;
2,2-bis-(4-hydroxyphenyl)-propane, hereinafter identified as "bisphenol-A" or "BPA";
1,1-bis-(4-hydroxyphenyl)-ethane;
1,1-bis-(4-hydroxyphenyl)-propane;
2,2-bis-(4-hydroxyphenyl)-pentane;
3,3-bis-(4-hydroxyphenyl)-pentane;
4,4'-dihydroxybiphenyl;
4,4'-dihydroxy-3,3',5,5'-tetramethylbiphenyl;
2,4'-dihydroxybenzophenone;
4,4'-dihydroxydiphenylsulfone;
2,4'-dihydroxydiphenylsulfone;
4,4'-dihydroxydiphenyl sulfoxide;
4,4'-dihydroxydiphenyl sulfide; etc.

The aromatic poly(formal carbonate) block polymers of the present invention, hereinafter referred to as block polymers, are film forming, clear, colorless thermoplastics having improved hydrolytic stability, as compared to conventional aromatic polycarbonates and improved heat distortion capabilities as compared to aromatic polyformals. The block polymers of the present invention also can be blended with other thermoplastic organic resins, such as Lexan polycarbonate, PPO polyphenylene oxide, and Valox polyester where all of the aforesaid thermoplastic organic resins are products of the General Electric Company, over wide proportions by weight, such as 1% to 99% of the block polymer and 99% to 1% of the high performance thermoplastic organic resin. In addition, the block polymers of the present invention also can be blended with various fillers, such as glass fiber, silicon carbide whiskers, silica filler, etc., stabilizers, pigments, flame retardants, etc.

In the practice of the invention, aromatic polyformal oligomer, in the form of an aromatic polyformal oligomeric series is combined with bisphenol included within formula (1) and phosgenated in the presence of a suitable inert organic solvent at temperatures in the range of from 0° C. to 100° C. Suitable inert organic solvents include, for example, methylene chloride, methylene bromide, etc.

In addition, chain-terminators, for example, phenol, 4-methylphenol, etc., also can be used to produce block polymer having a particular molecular weight. The chain-stoppers can be used at from 0.001 to 0.1 moles of chain-stopper, per mole of bisphenol.

Experience has shown the aromatic polyformal oligomeric series, i.e., a series of aromatic polyformal capable of forming units of formula (2) polymers, can be made by effecting contact at a temperature of 0° C. to 100° C. and preferably 40° C. to 100° C., between methylene halide and bisphenol in the presence of an amount of an alkali metal hydroxide insufficient to produce high molecular weight polymer, i.e., about 1.5 to 2.2 moles of alkali metal hydroxide, per mole of bisphenol of formula (1). Reaction can be conducted between excess methylene halide and bisphenol until all of the alkali metal hydroxide has been completely reacted.

Reflux temperatures at atmospheric pressure or above atmospheric pressure can be used along with agitation of the mixture. Reaction between methylene halide and bisphenol in the presence of alkali metal hydroxide can be accelerated by using a substantially inert, higher boiling, organic solvent in combination with methylene halide, such as a nonpolar or dipolar aprotic organic solvent. Non polar organic solvents which can be employed in the methylene halide are, for example, chlorobenzene, dichlorobenzene, benzene, toluene, etc. In addition, there can be used dipolar aprotic solvents, such as N-methylpyrrolidone, sulfolane, dimethylsulfoxide, etc.

Experience has shown that when methylene halide is employed in the absence of a dipolar aprotic solvent, effective results are achieved if a phase transfer catalyst is used to facilitate in situ formation of the alkali salt of the bisphenol and the subsequent condensation reaction with the methylene halide. Suitable phase transfer catalysts are, for example, quaternary ammonium and phosphonium salts, such as described in JACS 93, 195 (1971) by C. M. Starks. A proportion of from about 0.01 to 2.0 moles of the phase transfer catalyst per mole of the bisphenol has been found to provide for effective results, and preferably from 0.02 to 0.10 moles of phase transfer catalyst per mole of bisphenol can be employed.

The intercondensation reaction can be conducted over a period of from 0.1 hours to 24 hours or greater depending upon such factors as the nature of the methylene halide, whether an organic solvent is employed in combination with the methylene halide, the type of such organic solvent, temperature of the reaction, the degree of agitation, etc. In particular instances, for example, the more highly reactive methylene bromide can be substituted for methylene chloride or a mixture of chlorobenzene with methylene chloride will reflux at a higher temperature. In addition, the reaction can be conducted at elevated pressures, or in a closed system to permit the methylene halide to react with the bisphenol at a higher temperature. Those skilled in the art would know, for example, that the methylene halide itself, when used in excess amounts, can serve as a suitable organic solvent as well as a reactant.

At the termination of the reaction, the mixture can be diluted with an inert organic solvent, which can include the nonpolar organic solvent, the dipolar aprotic solvent, or mixtures thereof as previously defined. There can be used from about 0.5 to 100 parts or more of inert organic solvent per part of reaction mixture. The resulting aromatic polyformal oligomer having an intrinsic viscosity in chloroform at 25° C. of from 0.3 dl/g to 2.0 dl/g, can be filtered of solids, such as alkali metal halides.

Reverse precipitation of the aromatic polyformal from the clear polymer solution can be achieved by adding a precipitating solvent to the polymer solution while it is being highly agitated. Suitable precipitating solvents include, for example, acetone, methanol, mixtures thereof and other inert organic solvents in which the aromatic polyformal is highly insoluble. There can be used from about 0.5 to 100 parts or more of precipitating solvent per part of clear polymer solution.

It has been found that the aromatic polyformal can be isolated as a particulate having a high bulk density, such as 0.2 to 0.25 g/ml, as distinguished from the product obtained which can have a bulk density of from 0.05 to 0.07 g/ml and be stringy rather than in a particulate form. It has been found that under reverse precipitation conditions, linear aromatic polyformal can be isolated having as little as from 3 to less than about 1 percent by weight of cyclic aromatic polyformal, based on the weight of the aromatic polyformal.

In order that those skilled in the art will be better able to practice the present invention, the following examples are given by way of illustration and not by way of limitation. All parts are by weight.

EXAMPLE 1.

A mixture consisting of 22.8 parts of bisphenol-A, 41.5 parts of methylene chloride, 47.9 parts of N-methylpyrrolidone and 8.04 parts of 98% sodium hydroxide pellets, was stirred and refluxed under $N_2$ for 5 hours. The mixture was then allowed to cool to room temperature.

The mixture was then diluted with additional methylene chloride and filtered to remove inorganic salts. The resulting filtrate was then diluted with an equal volume of 50:50—acetone:methanol solution. There was obtained a precipitate which was recovered by filtration. It was washed with methanol and dried in vacuo at 60° C. There was obtained 17.4 parts of product having an intrinsic viscosity of 0.135 in chloroform and a $T_g$ of 79° C.

The above oligomeric polymer material was redissolved in methylene chloride and reprecipitated by addition to methanol. There was obtained 15.9 parts of product having an intrinsic viscosity of 0.148 in chloroform and a $T_g$ of 83° C. Based on method of preparation, product (A) was an aromatic polyformal oligomer having the formula,

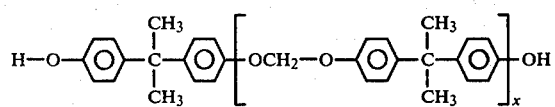

where x has an average value of 25.

The identity of the above product was further confirmed by its $^{13}C$-NMR spectrum. From end-group analysis, the average molecular weight of the product was calculated to be 6040 which was in agreement with the GPC value of 6000. Anal: Calc'd for $(C_{16}H_{16}O_2)_n$: C, 80.0; H, 6.7. Found: C, 79.5; H, 7.0.

Additional oligomeric polyformals were made following the same procedure except the value of the moles of alkali metal hydroxide, per mole of bisphenol were increased from 1.97 (A), to 2.00 (B), to 2.04(C) and to 2.10 (D). The following results were obtained.

| | % Yield | I.V. | $T_g$ (°C.) | Mn (GPC) | Mn ($^{13}$C-NMR) |
|---|---|---|---|---|---|
| A | 68* | 0.15 | 83° | 6,000 | 6,040 |
| B | 73** | 0.15 | — | 5,400 | 4,460 |
| C | 75* | 0.17 | — | 7,130 | 8,290 |
| D | 81* | 0.27 | — | 9,700 | 14,800 |

*after two precipitations
**after three precipitations

Phosgene was bubbled into a vigorously stirred reaction mixture for a total of 20 minutes while 25% sodium hydroxide solution was added intermittently to maintain the pH between 10 and 11.5 consisting of 4 parts of the above polyformal oligomer, 4 parts of bisphenol-A, 0.0649 part of phenol, 89.2 parts of methylene chloride, 26.74 parts of water and 0.06 part of triethylamine. The entire reaction mixture was then added to 500 parts of methanol. The resulting precipitated product was filtered and dried. There was recovered 8.35 parts of product which was redissolved in methylene chloride, filtered and then reprecipitated by addition to methanol. The polymer was filtered and dried. There was obtained 7.6 parts of product having an intrinsic viscosity of 0.66 and a $T_g$ of 120° C. The product was compression molded and it was found flexible and essentially clear. Based on method of preparation and its $^{13}C$-NMR spectrum the product was a block polymer consisting essentially of about 47% by weight of oligomeric polyformal having the formula,

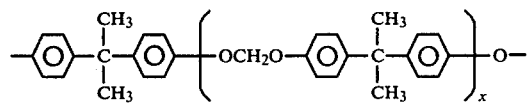

where x has an average value of about 25, chemically combined with about 53% by weight of polycarbonate having the formula,

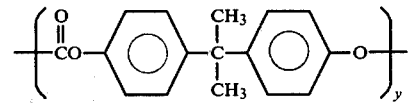

where y is an integer having a value of up to about 200.

Additional block polymers were prepared from some of the oligomeric polyformals of Table I following the same procedure and are shown in the following table:

TABLE II

| Oligomer/BPA (Weight Ratio) | I.V. | $T_g$ (°C.) | % Yield |
|---|---|---|---|
| A | | | |
| BPA (75:25) | 0.82 | 106° C. | 91 |
| B | | | |
| BPA (50:50) | 0.52 | 112° C. | 94 |
| A | | | |
| BPA (50:50) | 0.66 | 120° C. | 90 |
| A | | | |
| BPA (25:75) | 1.06 | 130° C. | 85 |

The above results show that the block polymers of the present invention possess significantly higher $T_g$'s than the oligomeric polyformal and qualify these block polymers for the production of injection moldable parts requiring a higher heat distortion temperature.

EXAMPLE 2.

Additional oligomeric polyformals were prepared following the same procedure and are shown as follows:

TABLE III

| | % Yield | I.V. | Mn (GPC) | Mn ($^{13}$C-NMR) |
|---|---|---|---|---|
| E | 62 | 0.07 | 2,300 | 2,140 |
| F | 78 | 0.11 | 3,140 | 2,440 |
| G | 92 | 0.28 | 14,290 | 10,350 |

These polyformal oligomers were converted to block polymers which are shown as follows:

TABLE IV

| Oligomer/BPA (Weight Ratio) | I.V. | $T_g$ (°C.) | % Yield |
|---|---|---|---|
| E/BPA (25:75) | 0.65 | 128° | 89 |
| E/BPA (50:50) | 0.66 | 114° | 91 |
| B/BPA (25:75) | 0.86 | 125° | 86 |
| B/BPA (50:50) | 0.06 | 119° | 83 |
| B/BPA (75:25) | 0.74 | 106° | 88 |
| C/BPA (25:75) | 0.98 | 128° | 94 |
| C/BPA (50:50) | 0.97 | 113° | 92 |
| C/BPA (75:25) | 0.94 | 101° | 91 |
| D/BPA (25:75) | 0.79 | 127° | 88 |
| D/BPA (50:50) | 1.00 | 112° | 96 |
| D/BPA (75:25) | 0.92 | 100° | 94 |

The above block polymers are injection moldable materials convertible to useful shapes and possessing improved heat distortion as compared to the corresponding polyformal oligomer.

Although the above examples are directed to only a few of the very many variables which can apply to the practice of the method of the present invention and to the block polymers made therefrom, it should be understood that the present invention is directed to a much broader class of block polymers composed essentially of units of formulas (2) and (3) which can be made by the use of bisphenols of formula (1), methylene halides and alkali metal hydroxides which are shown in the description preceding these examples.

In addition, the oligomeric aromatic polyformals also can be made by effecting reaction between a bisphenoxide salt of formula (1) and a methylene halide in the presence of an organic solvent.

What we claim as new and desire to secure by Letters Patent of the United States is:

1. A method for making aromatic polyformal-polycarbonate block polymer composed essentially of oligomeric aromatic polycarbonate which comprises,
   (A) agitating a mixture containing as essential ingredients bisphenol of the formula,

HOROH, methylene halide, from 1.5 to 2.2 moles of alkali metal hydroxide, per mole of bisphenol, and a member selected from the class consisting of a phase transfer catalyst and a dipolar aprotic solvent, where the phase transfer catalyst is utilized in a proportion of from about 0.01 to 2.0 moles, per mole of the bisphenol (B) diluting the resulting mixture of (A) with at least 0.5 part by weight of an inert organic solvent, per part of (A)
   (C) filtering the resulting solution of (B),
   (D) while agitating the solution of (C), adding at least 0.5 part by weight of an antisolvent per part of the solution of (C) to effect the precipitation of oligomeric aromatic polyformal,
   (E) combining the isolated oligomeric aromatic polyformal of (D) with a bisphenol of (A) and phosgenating the resulting mixture in the presence of a suitable inert organic solvent and
   (F) recovering the polyformal-polycarbonate block polymer from the mixture of (E) where R is a divalent $C_{(6-30)}$ aromatic organic radical.

2. A method in accordance with claim 1, where the bisphenol is 2,2-bis(4-hydroxyphenyl)propane.

3. A method in accordance with claim 1, where the methylene halide is methylene chloride.

4. A method in accordance with claim 1, where the alkali metal hydroxide is sodium hydroxide.

5. A method in accordance with claim 1, where N-methylpyrrolidone is utilized as the solvent in step (A).

6. Injection moldable block polymers consisting essentially of from 20% to 80% by weight of oligomeric aromatic polyformal having the formula:

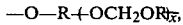

chemically combined with from 80% to 20% by weight of aromatic polycarbonate of the formula

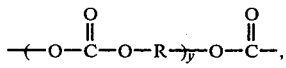

where R is a divalent $C_{(6-30)}$ aromatic organic radical, x is and integer having an average value of 5 to 200 and y is an integer having an average value of 1 to 200.

7. Block polymer in accordance with claim 6, where the dihydric phenol used in making the oligomeric aromatic polyformal and aromatic polycarbonate is 2,2-bis(4-hydroxyphenyl)propane.

8. Block polymer in accordance with claim 6, comprising 25% by weight of oligomeric polyformal and 75% by weight of polycarbonate.

9. Block polymer in accordance with claim 6, comprising 47% by weight of oligomeric polyformal and 53% by weight of polycarbonate.

* * * * *